March 17, 1959  W. M. SCARBOROUGH  2,878,445
THREE-AXIS TORQUER AND DISPLACEMENT DETECTOR
Filed Dec. 11, 1953  2 Sheets-Sheet 1
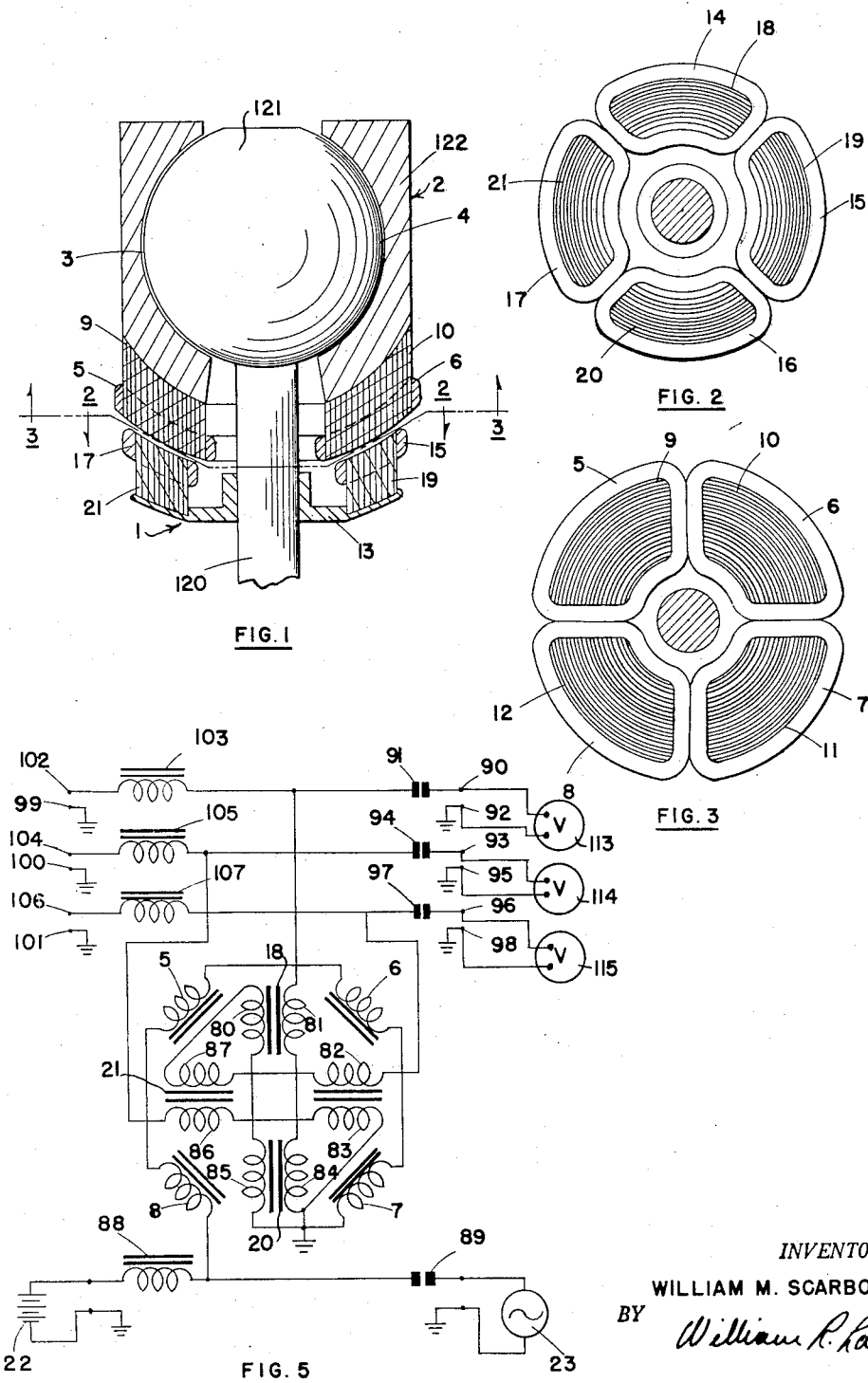
INVENTOR.
WILLIAM M. SCARBOROUGH
BY William R. Lane
ATTORNEY March 17, 1959 W. M. SCARBOROUGH 2,878,445
THREE-AXIS TORQUER AND DISPLACEMENT DETECTOR
Filed Dec. 11, 1953 2 Sheets-Sheet 2

*INVENTOR.*
WILLIAM M. SCARBOROUGH
BY William P. Lane
ATTORNEY

# United States Patent Office 2,878,445
Patented Mar. 17, 1959

2,878,445

THREE-AXIS TORQUER AND DISPLACEMENT DETECTOR

William M. Scarborough, Whittier, Calif., assignor to North American Aviation, Inc.

Application December 11, 1953, Serial No. 397,674

20 Claims. (Cl. 324—34)

This invention pertains to means for simultaneously producing a torque between a stator and a rotor about one or more mutually perpendicular axes oriented in free space, and for simultaneously detecting angular displacements about said axes.

In navigational instruments and the like, it is frequently desirable to apply torques between two bodies about one or more mutually prependicular axes. It has been customary, for example, to utilize the impulses of airjets wherein the airjets are mutually perpendicular so that they provide a torque about only one of three mutually perpendicular axes. Still another expedient that has been used to supply controlled torques to suspended masses wherein the suspended masses are suspended upon gimbals, is to apply a torque at the bearing connections between consecutive gimbals so that the gimbals freely uncouple the supported mass from its supporting structure. The device contemplated by this invention is adapted to simultaneously apply a torque about one or more of three mutually perpendicular axes. This is equivalent to applying a single torque about any single axis oriented arbitrarily. The device contemplated by this invention is further unique in that only one device is required to apply three components of torque between the stator and the rotor.

It is frequently also desirable to detect the position of the rotor with respect to the stator. It is usual to provide three devices for detecting the components of displacement about each of three mutually perpendicular axes. The device contemplated by this invention not only produces a torque of predetermined magnitude about an arbitrary axis selected at random, but also, without further structure, detects the position of the rotor relative to the stator with respect to three mutually pependicular predetermined axes.

It is therefore an object of this invention to provide means for simultaneously producing a torque and detecting an angular displacement.

It is another object of this invention to provide means for producing a torque of controlled amplitude and direction between a rotor and a stator about an arbitrarily oriented axis.

It is another object of this invention to provide means for simultaneously generating torques of controlled magnitude between a rotor and a stator about each of three mutually perpendicular axes.

It is yet another object of this invention to provide means for detecting angular displacements between a rotor and a stator about an arbitrarily selected axis.

Still another object of this invention is to provide means for simultaneously detecting the components of angular displacement between a rotor and a stator about each of three mutually perpendicular axes.

Other objects of invention will become apparent from the following description taken in connection with the accompanying drawings, in which:

Fig. 1 is a view, partially in section, of the combination torquer and detector of this invention;

Fig. 2 is a view taken at 2—2 in Fig. 1;

Fig. 3 is a view taken at 3—3 in Fig. 1;

Fig. 5 is an alternative embodiment of the electrical connections and associated circuitry of the device of this invention.

Figure 4:
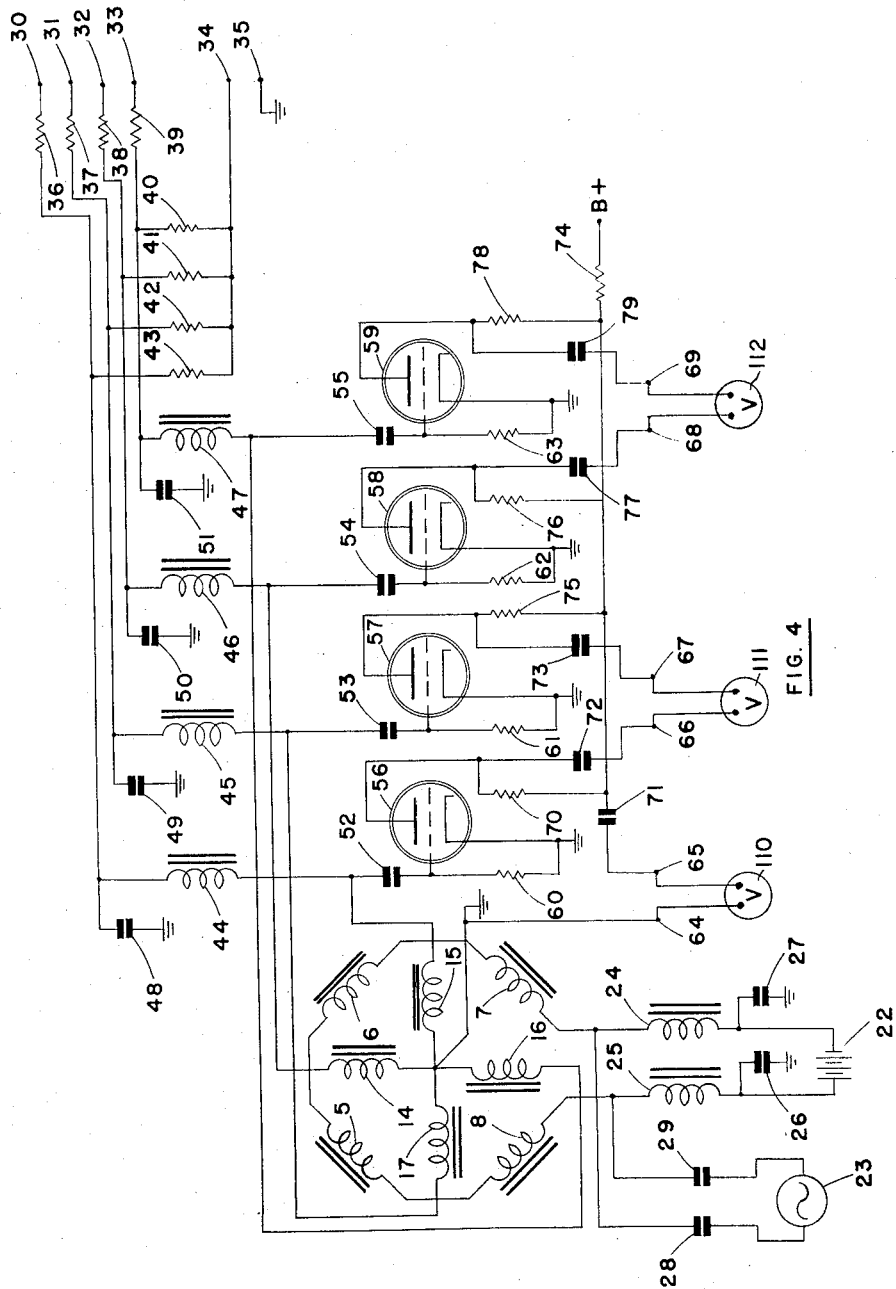
Fig. 4 is a schematic diagram of the electrical connections and associated circuitry of the device of this invention.

In Fig. 1, rotor 1 is universally supported to be free to rotate in any direction relative to stator 2. The universal support is achieved at bearing surfaces 3 and 4 which are usually lubricated, for example, by a gas or fluid. Rotor windings 14, 15, 16 and 17 are wound around cores 18, 19, 20 and 21, respectively which are preferably of ferromagnetic material. Cores 18, 19, 20 and 21 are mounted upon and supported by frame or bracket 13 which is rigidly connected to rotor spindle 120. A ball shaped member 121 forms one end of rotor spindle 120 and provides bearing surface 4. Stator coils 5, 6, 7 and 8 are wound around cores 9, 10, 11 and 12, respectively which are preferably of ferromagnetic material. Cores 9, 10, 11 and 12 are rigidly attached to stator base 122. Stator base 122 also provides bearing surface 3. The faces of windings 5, 6, 7 and 8 together with cores 9, 10, 11 and 12, as well as the faces of windings 14, 15, 16 and 17 together with the faces of cores 18, 19, 20 and 21 are curved surfaces which preferably approach the ideal of concentric spherical surfaces. It is not necessary, however, to adhere strictly to concentric spherical surfaces. For example, the surfaces of cores 18, 19, 20 and 21 may be moved up or down, the angle of their inclination may be changed, and their radius of curvature may be changed. Cores 9, 10, 11 and 12 need not conform to a surface of a concentric sphere but may deviate therefrom by being inclined differently than shown in Fig. 1. Of course, any deviation from surfaces of concentric spheres creates a nonlinear effect which may be undesirable.

The convexity of cores 9, 10, 11 and 12 is shown more particularly in Fig. 3 while the concavity of cores 18, 19, 20 and 21 is shown more particularly in Fig. 2.

As shown in Fig. 4, windings 8, 5, 6 and 7 are connected in series to be energized by means of direct current voltage source 22 and alternating current voltage source 23. Direct current voltage source 22 is connected to windings 8, 5, 6 and 7 through an alternating current blocking network comprising choke coils 24 and 25 in series with source 22, and condensers 26 and 27 in shunt with source 22. Alternating current voltage source 23 is connected in series with windings 8, 5, 6 and 7 through blocking condensers 28 and 29. Windings 8, 5, 6 and 7 are preferably connected so that the direct current flow through windings 6 and 8 generates a magnetic field of one polarity while the direct current flow through windings 5 and 7 generates a magnetic field of the opposite polarity. For purposes of discussion it is assumed that the direct current magnetic polarity of windings 6 and 8 is north and the direct current magnetic polarity of windings 5 and 7 is south. This connection of windings 8, 5, 6 and 7 causes the alternating current magnetic field of windings 6 and 8 to always be opposite to the instantaneous alternating current magnetic field of windings 5 and 7. Terminals 30, 31, 32, 33, 34 and 35 are electrically connected through current limiting resistors 36, 37, 38, 39, 40, 41, 42 and 43 to windings 14, 15, 16 and 17. Alternating current blocking choke 44 is connected in series with winding 15. Alternating current blocking choke 45 is connected in series with winding 17. Alternating current blocking choke 46 is connected in series with winding 14. Alternating current blocking choke 47 is connected in series with winding 16. Windings 14, 15, 16 and 17 have a common ground connection which is connected to terminal 35. Terminal 30 is connected through resistor 36 to choke 44 and is shunted to ground through condenser 48. Terminal 31 is connected through resistor 37 to choke 45 and is shunted to ground through condenser 49. Terminal 32 is connected through resistor 38 to choke 46 and is shunted to ground through condenser 50. Terminal 33 is connected through resistor 39 to choke 47 and is shunted to ground through condenser 51. Terminal 34 is connected to choke 44 through resistor 43, to choke 45 through resistor 42, to choke 46 through resistor 41, and to choke 47 through resistor 40. Condensers 52, 53, 54 and 55 prevent the direct current voltages applied to windings 14, 15, 16 and 17 from affecting the operation of tubes 56, 57, 58 and 59 as described hereinafter. The noncommon end of winding 15 is connected through condenser 52 to the grid of tube 56 which is biased by resistor 60. The noncommon terminal of winding 17 is connected to the grid of tube 57 through condenser 53. Tube 57 is biased by resistor 61. The noncommon terminal of winding 14 is connected through condenser 54 to the grid of tube 58. Tube 58 is biased by biasing resistor 62. The noncommon terminal of winding 16 is connected through condenser 55 to the grid of tube 59. Tube 59 is biased by biasing resistor 63. The plate of tube 56 is connected through resistor 70 and condenser 71 to terminal 65 and voltmeter 110. Terminal 64 is common and is grounded and connected to voltmeter 110. The plate of tube 56 is connected through condenser 72 to terminal 66 and to voltmeter 111. The plate of tube 57 is connected through condenser 73 to terminal 67 and to voltmeter 111. The plate of tube 57 is connected through resistor 75 to condenser 71 and to resistor 74 which in turn is connected to the positive terminal of the plate voltage of tubes 56, 57, 58 and 59. The plate of tube 58 is connected to resistor 74 through resistor 76. The plate of tube 58 is connected through condenser 77 to terminal 68 and to voltmeter 112. The plate of tube 59 is connected through resistor 78 to resistor 74. The plate of tube 59 is connected through condenser 79 to terminal 69 and to voltmeter 112. The cathodes of tubes 56, 57, 58 and 59 are grounded.

In the embodiment shown schematically in Fig. 5 a double winding is wound on each of rotor pole pieces 18, 19, 20 and 21. Windings 80 and 81 are wound about pole 18. Windings 82 and 83 are wound about pole 19. Windings 84 and 85 are wound about pole 20. Windings 86 and 87 are wound about pole 21. Windings 80, 81, 82, 83, 84, 85, 86 and 87 are wound in the positions of windings 14, 15, 16 and 17 in Fig. 2. Direct current voltage source 22 is connected between the ground terminal and A.-C. blocking choke 88. Alternating current voltage source 23 is connected between the ground terminal and direct current blocking condenser 89. Both voltage source 22 and 23 are connected in series with windings 8, 5, 6 and 7. Windings 8, 5, 6 and 7 are wound to cause the instantaneous magnetic field polarity of windings 6 and 8 to be opposite to the magnetic polarity of windings 5 and 7. Terminal 90 of voltmeter 113 is connected in series with blocking condenser 91, winding 81, winding 84 and the ground terminal. Terminal 92 of voltmeter 113 is connected to the ground terminal. Terminal 93 of voltmeter 114 is connected in series with blocking condenser 94, winding 86, winding 83 and the ground terminal. Terminal 95 of voltmeter 114 is connected to the ground terminal. Terminal 96 of voltmeter 115 is connected in series with blocking condenser 97, winding 82, winding 87, winding 80, and winding 85 to the ground terminal. Terminal 98 of voltmeter 115 is connected to the ground terminal. Terminals 99, 100 and 101 are connected to the ground terminal. Terminal 102 is connected in series with blocking choke 103, winding 81, winding 84 to the ground terminal. Terminal 104 is connected in series with blocking choke 105, winding 86, winding 83 to the ground terminal. Terminal 106 is connected in series with blocking choke 107, winding 82, winding 87, winding 80 and winding 85 to the ground terminal.

The operation of the device of this invention is first described as a torquer. A description of operation of the device of this invention as a displacement detector follows. It must be noted that the device of this invention is adapted to operate simultaneously as a torquer and a displacement detector.

In Figs. 1, 2, 3 and 4 balanced direct current voltages are applied to terminals 30 and 31 and to terminals 32 and 33. That is, when terminal 30 is positive with respect to the ground terminal 35, terminal 31 is negative by the same amount with respect to terminal 35, and when terminal 30 is negative with respect to the ground terminal 35, terminal 31 is positive by the same amount with respect to ground terminal 35. Similarly, when terminal 32 is positive with respect to ground terminal 35, terminal 33 is negative by the same amount with respect to ground terminal 35, and when terminal 32 is negative with respect to ground terminal 35, terminal 33 is positive by the same amount with respect to ground terminal 35. Consider the situation wherein a balanced voltage is applied across terminals 30 and 31 only. Coils 15 and 17 generate magnetic fields of opposite polarity. Consider, for example, that windings 6 and 8 generate a north magnetic pole while windings 5 and 7 generate a south magnetic pole. If in the particular instance winding 17 generates a north magnetic pole while winding 15 generates a south magnetic pole, winding 17 is attracted toward winding 5 and winding 15 is attracted toward winding 6 to thereby place a torque about an axis passing through the ball portion 121 of rotor 1 and extending from left to right in Fig. 1. If the polarity of the voltage applied between terminals 30 and 31 is reversed, winding 17 is then attracted toward winding 8 while winding 15 is attracted toward winding 7, to generate a torque about the same axis in the opposite direction. When voltage is applied between terminals 32 and 33, magnetic fields of opposite polarity are generated in coils 14 and 16. Consider, for example, that the magnetic field generated by coil 14 is north while the magnetic field generated by coil 16 is south. In this case, coil 14 is attracted toward coil 5 while coil 16 is attracted toward coil 8. When the polarity of the voltage applied between terminals 32 and 33 is reversed, coil 14 is attracted toward coil 6 and coil 16 is attracted toward coil 7. Hence, a voltage applied between terminals 32 and 33 creates a torque about an axis passing into the plane of the drawing of Fig. 1 and passing through the center of the ball portion 121 of rotor 1. When a voltage is applied between terminals 34 and 35 current is distributed equally in windings 14, 15, 16 and 17. Windings 14, 15, 16 and 17 are wound in a direction to cause windings 14 and 16 to have the same magnetic polarity and to cause windings 15 and 17 to have the same magnetic polarity but the magnetic polarity of windings 15 and 17 is opposite to the magnetic polarity of windings 14 and 16 when all four windings receive the same polarity of voltage. Hence, with a particular polarity of voltage applied between terminals 34 and 35, the magnetic polarity, for example, of windings 14, 15, 16 and 17 is as follows. Windings 14 and 16 are north and windings 15 and 17 are south. Hence, winding 14 is attracted toward winding 6, winding 15 is attracted toward winding 7, winding 16 is attracted toward winding 8, and winding 17 is attracted toward winding 5, thereby generating a torque about an axis which is coaxial with the rotor spindle 120. When the polarity of voltage between terminals 34 and 35 is reversed, windings 14 and 16 are magnetically south while windings 15 and 17 are magnetically north, whereby winding 14 is attracted toward winding 5 and winding 17 is attracted toward winding 8; winding 16 is attracted toward winding 7 and winding 15 is attracted toward winding 6 to reverse the direction of torque about the same axis.

Any combination of direct current voltages across terminals 30 and 31, terminals 32 and 33, and terminals 34 and 35 produces a corresponding combination of torques about the three axes of the torquer of this invention.

When the circuit of Fig. 4 is used in conjunction with the device of Figs. 1, 2 and 3 as a displacement detection device, an alternating magnetic field is generated in windings 5, 6, 7 and 8. The field of windings 6 and 8 is opposite in phase with the field of windings 5 and 7. The alternating field of windings 5, 6, 7 and 8 generates voltages in windings 14, 15, 16 and 17 by transformer action. The alternating voltages generated in coils 14, 15, 16 and 17 are connected through condensers 54, 52, 55 and 53, respectively to the grids of tubes 58, 56, 59 and 57. When rotor 1 is displaced about an axis coaxial with its spindle portion 120, a voltage whose phase depends upon the direction of displacement and whose amplitude depends upon the amplitude of displacement is generated in each of windings 14, 15, 16 and 17 so that the current variations on the plates of tubes 56, 57, 58 and 59 are identical. The alternating component is connected through condenser 71 to terminals 64 and 65 of voltmeter 110. The alternating voltage at terminals 64 and 65 appears on voltmeter 110 and is a measure of the displacement about an axis coaxial with the spindle portion 120 of rotor 1. When rotor 1 is rotated to cause windings 15 and 17 to move relative to windings 5 and 6, a voltage is generated in windings 15 and 17 whose phase depends upon whether windings 15 and 17 have been moved closer to windings 5 and 6 or closer to windings 7 and 8. The voltage generated in windings 15 and 17 is applied to the grids of tubes 56 and 57. The current variations upon the plates of tubes 56 and 57 pass through condensers 72 and 73 and appear at terminals 66 and 67 of voltmeter 111. Hence, the voltage at terminals 66 and 67 appears on voltmeter 111 and is a measure of the displacement of rotor 1 about an axis passing through the center of the spherical portion 121 of rotor 1 in the plane of the drawing. Similarly, a displacement about an axis passing through the center of the spherical portion 121 of rotor 1 perpendicular to the plane of the drawing causes windings 14 and 16 to move relative to windings 5, 6, 7 and 8 in a left or right direction in Fig. 4. The voltages generated in windings 14 and 16 appear at the grids of tubes 58 and 59, respectively. The current variations in the plate current of windings 58 and 59 pass condensers 77 and 79 and appear at terminals 68 and 69 of voltmeter 112. Hence, the voltage at terminals 68 and 69 appears on voltmeter 112 and is a measure of the displacement of rotor 1 about an axis perpendicular to the sheet of the drawings, passing through the center of the spherical portion 121 of rotor 1.

In Fig. 5, when a direct current voltage is placed between terminals 102 and 99, coil 81 is energized with a north magnetic polarity while coil 84 is energized with a south magnetic polarity. If coils 6 and 8 are energized with a north magnetic polarity while coils 5 and 7 are energized with a south magnetic polarity, coil 81 is attracted toward coil 5 and coil 84 is attracted toward coil 8. When the polarity of the voltage applied to terminals 99 and 102 is reversed, coil 81 is energized to have a north magnetic polarity while coil 84 is energized to have a south magnetic polarity whereby coil 81 is attracted toward coil 6 and coil 84 is attracted toward coil 7. This places a torque about an axis passing through the center of the spherical portion 121 of rotor 1 perpendicular to the sheet of the drawings. When a direct current voltage is placed between terminals 100 and 104, coils 86 and 83 are energized, for example, to cause coil 86 to have a north magnetic polarity while coil 83 has a south magnetic polarity. This causes coil 86 to be attracted toward coil 5 while coil 83 is attracted toward coil 6. When the polarity of the voltage applied to terminals 100 and 104 is reversed coil 86 is energized with a south magnetic polarity while coil 83 is energized with a north magnetic polarity to cause coil 83 to be attracted toward coil 7 and coil 86 to be attracted toward coil 8. This generates a torque about an axis which passes through the center of the spherical portion 121 of rotor 1 in the plane of the drawings. When a direct current voltage is applied between terminals 101 and 106, coils 82, 87, 80 and 85 are energized to cause, for example, coil 82 to have north magnetic polarity, coil 87 to have a south magnetic polarity, coil 80 to have a north magnetic polarity and coil 85 to have a south magnetic polarity. Hence, coil 82 is attracted toward coil 7, coil 87 is attracted toward coil 5, coil 80 is attracted toward coil 6, and coil 85 is attracted toward coil 8. When the polarity of the direct current voltage applied to terminals 101 and 106 is reversed coil 82 has a south magnetic polarity, coil 87 has a south magnetic polarity, coil 80 has a north magnetic polarity, and coil 85 has a north magnetic polarity to cause coil 82 to be attracted toward coil 6, coil 87 to be attracted toward coil 8, coil 80 to be attracted toward coil 5 and coil 85 to be attracted toward coil 7, to generate a torque about an axis coaxial with the rotor spindle 120. Alternating current voltage source 23 generates an alternating current magnetic field in coils 5, 6, 7, and 8 in which the magnetic polarity of coils 6 and 8 are instantaneously opposite in phase with the magnetic polarity of coils 5 and 7. Voltages are generated in coils 80, 81, 82, 83, 84, 85, 86 and 87 by transformer action. When coils 86 and 83 move toward coils 5 and 6, respectively, voltages are generated in windings 83 and 86 which are proportional to said movement and which are detected at terminals 93 and 95 of voltmeter 114. When coils 81 and 84 move toward coils 5 and 8, voltages are generated in coils 81 and 84 which are detected at terminals 90 and 92 of voltmeter 113 and are proportional to said movement. When coils 82, 87, 80 and 85 are rotated about the axis of the rotor spindle 120, voltages are generated therein which are proportional to said rotation and are detected at terminals 96 and 98 of voltmeter 115.

Thus, the device of this invention is capable of simultaneously producing a torque and means for detecting rotation about a common center. Alternatively, the device of this invention may be used either as a torquer or as an angular displacement detector. The device of this invention is particularly valuable for use in gyroscopic instruments for navigational purposes.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for selectively applying a torque of controlled magnitude and orientation to a rotor comprising electromagnetic rotor windings adapted for generating a first direct current magnetic field wherein the magnetic polarities of adjacent quadrants about a predetermined axis of said rotor are consecutively north and south; stator means having electromagnetic stator windings magnetically coupled to said first-named windings for generating a second direct current magnetic field; and means for selectively energizing said stator windings in adjacent quadrants about a predetermined axis of said stator means to apply a torque of controlled magnitude and orientation between said rotor and said stator.

2. Means for selectively generating a torque of controlled magnitude and orientation between a stator and a rotor comprising a pair of electromagnets including electrical windings in each quadrant about a predetermined axis, said stator including one of said electromagnets, said rotor including the second of said electromagnets; electrical current means connected to energize one said electromagnet wherein the magnetic poles of adjacent quadrants about said axis are consecutively north and south; and second electrical means connected to said second electromagnet to selectively create a direct current magnetic field wherein the magnetic poles of adjacent quadrants are selectively varied in amplitude and polarity to generate a torque about one or more of said axes.

3. Means for selectively generating a torque upon a rotor about a first, second and third axis comprising a stator adjacent said rotor; a pair of electromagnets including electrical windings divided into quadrants about said first axis, said stator including one of said electromagnets and said rotor including the other of said electromagnet; direct current electrical means attached to the coils of one said electromagnet to generate a magnetic field wherein the magnetic poles of adjacent quadrants about said first axis are consecutively north and south; and second direct current means connected to the coils of said second electromagnet to selectively generate a magnetic field in each quadrant about said first axis to generate a torque of controlled magnitude and orientation upon said rotor.

4. Means for selectively generating a torque of controlled magnitude and orientation upon a movable element comprising a first electromagnet having windings distributed about a predetermined axis; a stator including said electromagnet; a second electromagnet magnetically coupled to said first electromagnet and having windings distributed about said predetermined axis; said movable element including said second electromagnet; and means for energizing said windings in each of the quadrants about said axis to cause the adjacent quadrants of one said magnetic means to have a magnetic polarity which is consecutively different from quadrant to quadrant and to cause the polarity and amplitude of the magnetic field generated by said windings in each of the quadrants of said second electromagnet to be independently and selectively variable in amplitude and polarity whereby a torque of controlled magnitude and orientation is generated upon said movable element.

5. In combination, a rotor having three degrees of rotational freedom about an azimuth, a pitch, and a roll axis; a stator adjacent to and bearing-supporting said rotor; said stator including first electromagnetic windings uniformly distributed about said azimuth axis; said rotor including second electromagnetic windings uniformly distributed about said azimuth axis; means for energizing said first-named electromagnetic windings to cause the magnetic polarities of adjacent quadrants to be mutually opposite; electrical means for selectively energizing said second-named electromagnetic windings in amplitude and polarity; and means for causing the polarities of opposite quadrants of said second electromagnetic windings to be selectively identical or opposite whereby a torque is generated between said rotor and stator about at least one said axis.

6. Means for detecting angular displacement of a rotor, about one or more mutually perpendicular axes comprising means including electrical windings, for generating an alternating current magnetic field wherein the magnetic polarities of adjacent quadrants about one axis of said rotor are maintained mutually opposite in phase, said rotor including said last named means; stator means, including electrical windings, magnetically coupled to said first-named windings; and electrical means connected to said second-named windings to measure the voltages induced therein whereby the phase and amplitude of said induced voltages are a measure of the angular displacement of said rotor from a predetermined initial position.

7. Means for measuring the angular displacement of a rotor relative to a stator about at least one of three mutually perpendicular axes of said rotor comprising electromagnetic means integral with said rotor including electrical windings in each quadrant about one axis of said rotor; electromagnetic means integral with said stator substantially parallel to said first-named electromagnetic means, including electrical windings magnetically coupled to said first-named windings; alternating current means connected to said second-named windings to generate an alternating current magnetic field wherein the magnetic polarities of adjacent quadrants about one axis of said rotor are maintained mutually opposite in polarity; and means connected to said first-named coils to measure the amplitude and phase of the voltages induced therein whereby the amplitude and phase of said voltages are a measure of the displacement of said rotor from a predetermined initial position.

8. Means for measuring the angular displacement of a rotor from an initial position relative to a stator adjacent said rotor comprising a pair of electromagnetic means including electrical coils distributed into quadrants about a first axis, one said electromagnetic means being integral with said stator and the other said electromagnetic means being integral with said rotor; alternating current electrical means attached to the coils of one said electromagnetic means to generate an alternating magnetic field wherein the magnetic polarities of adjacent quadrants about said first axis are mutually opposite in polarity; and electrical measuring means connected to the coils of said second electromagnetic means to measure the amplitude and phase of the voltages induced therein whereby said induced voltages are a measure of the angular rotation of said rotor about said first axis and about a pair of mutually perpendicular axes in a plane perpendicular to said first axis.

9. Means for measuring the angular displacement of a rotor from an initial position about at least one of three mutually perpendicular axes comprising electromagnetic means integral with said rotor having windings distributed about one said axis; a stator; second electromagnetic means integral with said stator having windings distributed about said axis; alternating current means for energizing said windings of one said electromagnetic means in each of the quadrants about said axis to cause the adjacent quadrants thereof to have magnetic polarities which are always mutually opposite; and measuring means attached to said windings of the other said electromagnetic means to measure the phase and amplitude of the voltage induced therein by said energized electromagnetic means whereby the amplitude and polarity of said measured voltage is a measure of the displacement of said rotor about said axes.

10. In combination, a rotor having three degrees of rotational freedom about an azimuth, a pitch and a roll axis; a stator adjacent to and bearing-supporting said rotor; electromagnetic means integral with said stator having windings which are uniformly distributed about said azimuth axis; second electromagnetic means integral with said rotor having windings which are uniformly distributed about said azimuth axis; alternating current means for energizing said first-named electromagnetic means to cause the magnetic polarities of adjacent quadrants to be mutually opposite; and means for measuring the amplitude and polarity of the voltage induced in said second electromagnetic means whereby said amplitude and phase of said induced voltage is a measure of the displacement of said rotor about said azimuth, pitch and roll axes.

11. Means for simultaneously producing a torque between a stator and a rotor and for measuring the angular displacement of said rotor relative to said stator about at least one of three mutually perpendicular axes comprising electromagnetic means integral with said stator having windings distributed about a first said axis; electromagnetic means integral with said rotor having windings distributed about said first axis; direct current means attached to said windings of one said electromagnetic means to generate a steady magnetic field in which adjacent quadrants about said first axis have mutually opposite magnetic polarities; alternating current means attached to the same said windings of the same said electromagnetic means for generating an alternating magnetic field superimposed upon said steady magnetic field wherein the alternating magnetic polarities of adjacent quadrants about said first axis are always mutually opposite in phase; means for selectively applying direct current to the second said electromagnetic means to generate a direct current magnetic field which reacts with said first steady magnetic field to generate a torque between said stator and said rotor; and alternating current measuring means attached to said second electromagnetic means to measure the phase and amplitude of the alternating voltage induced therein; alternating current blocking circuits inserted in each said direct current circuit to prevent interference with the operation thereof by said alternating current voltages; and direct current blocking circuits inserted in said alternating current circuits to prevent interference therewith by said direct current voltages.

12. In combination with a rotor mounted for universal angular freedom relative to a stator, means for simultaneously producing a torque and detecting angular displacements about at least one of three mutually perpendicular axes arbitrarily oriented within said rotor and having their origin at the center of rotation thereof.

13. Means for producing a torque between a rotor and a stator wherein said rotor is nontranslating relative to said stator, comprising an extended bracket integral with said rotor; a plurality of electromagnetic rotor windings mechanically attached to said bracket and integral with said rotor, said windings being symmetrically arranged about a first axis which passes through the center of rotation of said rotor; a plurality of electromagnetic stator windings integral with said stator symmetrically arranged about said first axis; electrical means connected to one said plurality of electromagnetic windings to cause said windings in adjacent quadrants thereof about said first axis to generate, between said rotor and stator windings, magnetic fields which are consecutively different in polarity; and means for selectively energizing the quadrants of the other said plurality of electromagnetic windings to selectively energize the windings in different quadrants about said first axis to produce a torque about at least one of three mutually perpendicular axes which include said first-mentioned axis.

14. A device as recited in claim 13 in which said electrical means is connected to one said plurality of electromagnetic windings to cause said windings in adjacent quadrants thereof about said first axis to generate, between said rotor and stator windings; magnetic fields which are consecutively different in polarity, and in which said means for selectively energizing the quadrants of the other said plurality of electromagnetic windings are direct current devices, and further comprising alternating current means connected to one said plurality of electromagnetic windings to cause windings in adjacent quadrants thereof about said first axis to generate an alternating magnetic field between said rotor and stator wherein the alternating magnetic polarity of consecutive quadrants about said first axis is always opposite, said alternating magnetic field being superimposed upon said direct magnetic field, and alternating current detecting means attached to the other said plurality of electromagnetic windings whereby the amplitude and phase of the voltages induced in said other electromagnetic windings is a measure of the angular displacement of said rotor relative to said stator.

15. Means for generating a torque between a rotor and a stator and for detecting angular displacement about at least one of three mutually perpendicular axes which pass through the center of rotation of said rotor, comprising bracket means integral with said rotor; at least four electromagnetic rotor windings upon said bracket and integral with said rotor, one in each quadrant, positioned symmetrically about a first said axis; a set of stator windings integral with said stator adjacent said first-mentioned windings and having at least one electromagnetic winding in each quadrant about said first axis, said rotor windings being initially positioned about said first axis at an angle of forty-five degrees from said stator windings; direct current means connected to said stator windings for generating a direct current field having opposite polarities in adjacent quadrants about said first axis; alternating current means connected to said stator windings to generate an alternating magnetic field wherein the magnetic polarity is opposite in phase in consecutively adjacent quadrants about said first axis; means for selectively energizing said rotor windings to generate torques about said axes between said rotor and said stator; and detecting means electrically connected to said rotor windings to detect the amplitude and phase of the alternating voltage generated therein whereby said amplitude and phase is a measure of the displacement of said rotor relative to said stator about said three axes.

16. A device as recited in claim 15 wherein said detecting means comprises blocking condensers connected to each of said rotor windings to prevent direct current interference; four vacuum tubes, each said vacuum tube having its input connected to a different one of said rotor windings, the electrical output of two of said tubes being combined to produce a signal proportional to the displacement of said rotor relative to said stator about one said axis, the electrical outputs of the other two of said tubes being combined to produce a signal proportional to the angular displacement of said rotor relative to said stator about a second said axis; and electrical outputs of all four said tubes being combined to generate a signal proportional to the displacement of said rotor relative to said stator about the third said axis.

17. A device as recited in claim 15 and further comprising a second rotor winding in each said quadrant of said rotor about said first axis, the first said winding of each pair of opposite quadrants being connected in series, the second said winding of all said quadrants being connected in series whereby when direct current is applied to one pair of oppositely arranged quadrants a torque is produced about one said axis, when a direct current is applied to the second pair of oppositely arranged quadrants a torque is produced about a second said axis, when a direct current is applied to said second windings upon said rotor to thereby energize all four said quadrants a torque is produced about the third said axis; and whereby when said rotor is displaced about any one of said axes, alternating voltages are induced in said windings, the phase and amplitude of which is a measure of the angular displacement of said rotor relative to said stator about said three axes.

18. A device as recited in claim 15 and further comprising alternating current blocking means between said windings and said direct current sources; direct current blocking means between said windings and said alternating current source; and direct current blocking means between said windings and said alternating current detecting device.

19. In combination, a pair of members including a stator and a rotor, one of said members having magnetic means for providing a magnetic field wherein the magnetic polarities of adjacent quadrants about a predetermined axis of said member are consecutively north and south, the other of said members having electromagnetic means for providing a direct current magnetic field, and means for selectively energizing said electromagnetic means in adjacent quadrants about a predetermined axis of said last named member to apply a torque of controlled magnitude and orientation between said rotor and said stator.

20. Means for simultaneously producing a torque between a stator and a rotor and for measuring the angular displacement of said rotor relative to said stator about at least one of three mutually perpendicular axes of said rotor comprising a pair of members including said stator and said rotor, one of said members having magnetic means for providing a steady magnetic field in which adjacent quadrants about a predetermined axis of said members have mutually opposite magnetic polarities, said same member having alternating current means including windings for generating an alternating magnetic field wherein the magnetic polarities of adjacent quadrants about said predetermined axis of said member are maintained mutually opposite in polarity, the other of said members having electromagnetic means for providing a direct current magnetic field, means for selectively energizing said electromagnetic means in adjacent quadrants about a predetermined axis of said last named member, said windings of said first named member being magnetically coupled to said electromagnetic means of said last named member, and means for measuring the amplitude and polarity of the voltage induced in said electromagnetic means whereby said amplitude and phase of said induced voltage is a measure of the displacement of said last named member about said axes.

References Cited in the file of this patent

UNITED STATES PATENTS

| | | |
|---|---|---|
| 2,270,876 | Esval et al. | Jan. 27, 1942 |
| 2,474,549 | Schoeppel | June 28, 1949 |